Patented Jan. 3, 1950

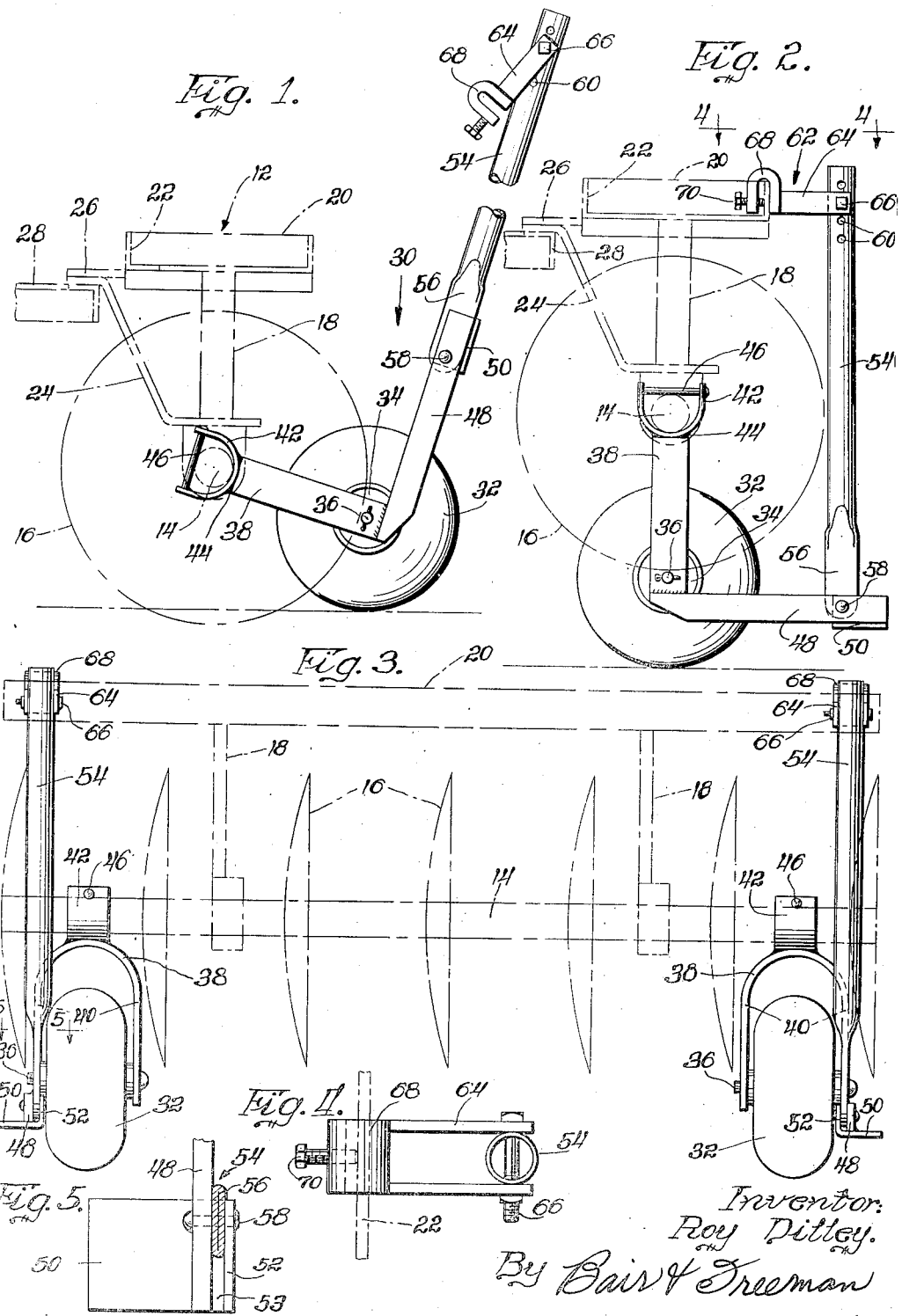

2,493,230

UNITED STATES PATENT OFFICE 2,493,230

DISK TRANSPORT

Roy Dilley, Cedar Falls, Iowa, assignor to Waterloo Tire Retreading Company, Waterloo, Iowa, a copartnership Application July 31, 1948, Serial No. 41,879

6 Claims. (Cl. 214—65.4)

This invention relates to a device for use in transporting a disc harrow from one place to another.

As is well known, the farm implement known as the disc, or disc harrow, includes a number of disc elements which engage the ground in soil working operations, and the disc elements themselves support the implement. In transporting the implement from one field to another, it would ride on the disc elements with consequent injury thereto were it not for transport devices.

In general, the purpose of the device of the present invention is that several of them can be attached to a disc harrow whereby the disc elements are raised from the ground and the implement rides on the transports.

An object of the present invention is the provision of a disc transport which can be easily and quickly applied to a disc harrow.

Another object is the provision of a disc transport, by means of which in its application to the disc harrow, the disc harrow can be easily lifted from the ground by foot pressure of the operator.

Still another object is the provision of a device, as referred to above, which is readily adaptable to implements of different sizes.

Another object is the provision of such a device which when it is detached from the implement, occupies a minimum of space.

A further object is the provision of such a device which is made up of simple parts, resulting in an economical article of manufacture.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figures 1, 2 and 3 illustrate the device of the present invention in full lines, and the implement to which the device is attached in dot-dash lines;

Figure 1 is a side view of the device of the present invention in the first position of applying it to the implement, showing the implement in end view;

Figure 2 is a side view of the device after it has been attached to the implement;

Figure 3 is a view from the right of Figure 2;

Figure 4 is a view taken on line 4—4 of Figure 2; and

Figure 5 is a view taken on line 5—5 of Figure 3.

Referring now in detail to the drawings, the reference numeral 12 indicates the implement to which the device of the present invention is applied. The implement 12 is what is known as a disc, or disc harrow, and includes a central axle or spool 14 upon which are mounted a plurality of axially spaced disc elements 16. A plurality of brackets 18 extend upwardly from the axle 14 and support a framework 20 above the disc elements 16. The framework 20 may be of any desired construction, but is usually formed with an upstanding flange 22 around its periphery. The frame 20 is customarily employed for supporting a weight for causing the disc elements to penetrate the ground. Brackets such as 24 and 26 are secured to the brackets 18 and frame 20 and to a tongue 28, or other convenient hitch bar. The tongue 28 extends forwardly, or in the direction of travel, of the implement and is employed for hitching or connecting to the draw-bar of a draft vehicle, such as a tractor. The forward end of the tongue 28 being connected to the draft vehicle supports the frame 20 of the implement in its upright position illustrated in Figures 1 and 2.

The disc transport device forming the essence of the present invention is indicated in its entirety at 30. The device 30 includes a wheel 32 which may include a pneumatic tire, provided with a hub 34 and an axle 36.

A U-shape bracket 38 is inverted over the wheel with the legs 40 of the bracket straddling the wheel and the lower ends thereof supported on the axle 36. The closed end of the U-shape bracket 38 then extends upwardly radially from the axle 36.

A U-shape yoke 42 is disposed with its closed end abutting the upper closed end of the bracket 38 and welded thereto, as indicated at 44. The open end of the U-shaped yoke 42 therefore opens upwardly, or axially outwardly from the axle. The upper ends of the legs of the yoke 42 are provided with aligned holes for the reception of a bolt or pin 46.

An arm 48 is secured to the lower end of one of the legs of the bracket 38, as by welding. The arm 48 extends transversely from the bracket 38 and is disposed adjacent the axle 36.

Secured to the outer end of the arm 48 is a step plate 50. The step plate 50 is welded to the under-surface of the arm 48 and has a turned up flange 52 spaced a short distance from the plane of the arm 48. The main portion of the step plate extends from the opposite side of the arm 48. The flange 52 and the outer end of the arm 48 provide a space 53 for bearing engagement of the lower end of a link 54. The link 54 may be a tubular member, or other convenient member; in the case of a tubular member, the lower end is flattened, as indicated at 56, and inserted in the space 53. The lower end of the link 54 and the flange 52 and arm 48 are provided with holes for the reception of a rivet or bolt, 58 for mounting the link 54. The link 54 is thus free to pivot on the rivet 58.

The upper or extended end of the link 54 is provided with a plurality of holes 60.

A second link 62 is mounted on the upper end of the link 54. The link 62 may include spaced arms 64 which straddle the link 54. The arms 64 are provided with aligned holes for the reception of a bolt 66 therethrough and through one of the holes 60. Formed on the outer or swinging end of the link 62 is a hook element 68 arranged so that in its final position, as illustrated in Figure 2, it opens downwardly with depending legs. One of its depending legs is secured to the arms 64. The legs of the hook element 68 are thus provided with substantial dimension vertically and horizontally in directions transverse to the longitudinal dimension of the arms 64. A set screw 70 is threaded through a tapped hole in the outer leg of the hook element 68.

In use of the device, the pin 46 is removed from the yoke 42 and the yoke then inserted under the spool or axle 14 of the disc, as shown in Figure 1. The pin 46 can then be re-inserted if desired. The wheel 32 is thus disposed outwardly from the axle 14 due to the length of the bracket 38 being designed for that purpose. The operator then presses his foot on the step plate 50 and in bearing downwardly thereon, the bracket 38 and arm 48 act as a bell crank, lifting the axle and disc and running the wheel directly under the implement. Then the link 54 is swung to vertical position as illustrated in Figure 2 and the hook element 68 is positioned over the flange 22 on the frame 20. Thereafter, the set screw 70 is turned in tight against the flange.

With the device thus positioned under the axle of the implement and the link 62 attached to the frame 12 of the implement, the device is held rigid and does not collapse. The extensive bearing surface of the legs of the hook element 68 exerted on the flange 22 prevents the collapsing of the device. The tongue 28 of the implement being secured to the drawbar of the draft vehicle prevents the implement from falling off balance from the disc transport.

The holes 60 being spaced along the length of the link 54 enable the link 62 to be detachably secured in any of them and the device to be attached to almost any type and size of disc harrows in common use. The link 62 is secured in one of the upper holes 60 for large size disc harrows.

Preferably, the devices are in pairs, namely right and left transports. Figure 3 illustrates this arrangement in which the step plates and the attached links 54 are disposed on the outer sides of the respective wheels.

The device is made up of extremely simple pieces which are economical to manufacture, both in the amount of material used and in the methods of manufacturing. The device possesses great strength which is uncommon in such simple devices. When the device is removed from its operative position, it occupies a small space and can be carried on the frame 20 or can be left in the field and picked up by the operator in transporting the device from the field to the yards.

The length of the bracket 38 is sufficient to lift all sizes of disc implements off the ground. Different diameter discs are lifted to different extents, e. g., an 18″ diameter disc is lifted 5″ off the ground and a 16″ diameter disc is lifted 6″ off the ground. These specific figures are, of course, only examples and the invention of course is not limited to such dimensions.

While I have herein shown and described a preferred embodiment of my invention, manifestly it is capable of modification and rearrangement of parts without departing from the spirit and scope thereof. I do not, therefore, wish to be understood as limiting this invention to the precise form herein disclosed, except as I may be so limited by the appended claims.

I claim as my invention:

1. In a device of the character described, for use with an implement having an axle and a frame thereabove, the combination comprising, a wheel and axle, a radially extending bracket mounted on the wheel and axle, a yoke mounted on the outer end of said bracket and opening outwardly therefrom, an arm rigidly secured to said bracket and extending transversely therefrom, said yoke being adapted for positioning under and supporting the axle of the implement, a step plate mounted on the outer end of said arm, and means pivoted on the outer end of said arm for securing to the frame of the implement.

2. In a device of the character described, the combination comprising, a wheel and axle, a radially extending bracket mounted on the axle, a yoke mounted on the outer end of said bracket and opening radially outwardly therefrom, an arm rigidly secured to said bracket adjacent the axle and extending transversely from said bracket, a step plate mounted on the outer end of said arm, a link pivoted on the outer end of said arm, a second link pivoted on the extended end of said first link, and securing means on the extended end of said second link.

3. In a device of the character described, the combination comprising, a wheel and axle, a radially extending bracket mounted on the axle, a yoke mounted on the outer end of said bracket and opening radially outwardly therefrom, an arm rigidly secured to said bracket and extending transversely therefrom, a link pivoted on the outer end of said arm, a second link pivoted on the extended end of said first link, hook means on the outer end of said second link, and securing means mounted in the said hook means.

4. In a device of the character described, the combination comprising, a wheel and axle, a radially extending bracket mounted on the axle, a yoke mounted on the outer end of said bracket and opening radially outwardly therefrom, an arm rigidly secured to said bracket and extending transversely therefrom, a link pivoted on the outer end of said arm, a second link pivoted on the outer end of said first link and adjustable to different positions along the length of said first link, hook means on the outer end of said second link, said hook means having substantial length and height in a plane transverse to the length of said second link, and securing means in said hook means.

5. In a device of the character described, the combination comprising, a wheel and axle, a U-shape bracket secured to said axle with its closed end extending radially from the axle, a U-shape yoke secured to the outer end of said bracket with its open side extending outwardly from said bracket, an arm rigidly secured to said bracket adjacent the axle and extending transversely from said bracket, a step plate mounted on the outer end of said arm, a link pivoted on the outer end of said arm, a second link pivoted on the outer end of said first link, said second link being adjustable along the length of said first link, hook means on the outer end of said second link, said hook means having substantial length and height with respect to the length of said second link, and securing means mounted in said hook means.

6. In a device of the character described, for use with an implement having an axle and a frame thereabove, the combination comprising, a wheel and axle, a radially extending bracket mounted on the wheel and axle, a yoke mounted on the outer end of said bracket and opening outwardly therefrom, an arm rigidly secured to said bracket and extending transversely therefrom, said yoke being adapted for loosely and detachably positioning under and supporting the axle of the implement, said yoke and bracket being vertically disposed when supporting the implement, a link pivoted on the outer end of said arm, a second link pivoted on the extended end of said first link, and means on the extended end of said second link for rigidly securing the second link to the frame of the implement.

ROY DILLEY.

REFERENCES CITED

The following references are of record in the file of this patent:

UNITED STATES PATENTS

| Number | Name | Date |
|---|---|---|
| 694,113 | Sharp | Feb. 25, 1902 |
| 1,019,345 | Needham | Mar. 5, 1912 |
| 1,020,983 | Heylman | Mar. 26, 1912 |
| 1,619,904 | Wenndt | Mar. 8, 1927 |
| 2,058,691 | Holstein et al. | Oct. 27, 1936 |
| 2,475,454 | Merrill | July 5, 1949 |